(12) United States Patent
Ling et al.

(10) Patent No.: US 7,671,573 B1
(45) Date of Patent: Mar. 2, 2010

(54) APPARATUS AND METHOD FOR PROJECTED ON-TIME REGULATOR

(75) Inventors: Lawrence Hok Sun Ling, Fanling (CN); Xiaoru Xu, Hangzhou (CN)

(73) Assignee: National Semiconductor Corporation, Santa Clara, CA (US)

( * ) Notice: Subject to any disclaimer, the term of this patent is extended or adjusted under 35 U.S.C. 154(b) by 112 days.

(21) Appl. No.: 12/129,623

(22) Filed: May 29, 2008

(51) Int. Cl.
  *G05F 1/00* (2006.01)
(52) U.S. Cl. .................. 323/283; 323/285
(58) Field of Classification Search ........ 323/283, 323/284, 285
  See application file for complete search history.

(56) References Cited

U.S. PATENT DOCUMENTS

| | | | |
|---|---|---|---|
| 6,396,251 B2 | 5/2002 | Corva et al. | |
| 6,628,109 B2 | 9/2003 | Rincon-Mora | |
| 6,885,175 B2 | 4/2005 | Mihalka | |
| 7,397,678 B2 * | 7/2008 | Frank et al. | 363/89 |

OTHER PUBLICATIONS

Yang, X. et al., "A Novel Quasi-Constant Frequency Hysteretic Current Mode Control Approach," Power Electronics Specialist Conference, 2003 PESC '03, 2003 IEEE 34th Annual, 3(15-19):1147-1150, Jun. 2003.
Sahu, B. et al., "An Accurate, Low-Voltage, CMOS Switching Power Supply with Adaptive On-Time Pulse-Frequency Modulation (PFM) Control," Circuits and Systems I: Regular Papers, IEEE Transactions on [Circuits and Systems I: Fundamental Theory and Applications, IEEE Transactions on], 54(2):312-321, Feb. 2007.
Castilla, M. et al., "Design of Voltage-Mode Hysteretic Controllers for Synchronous Buck Converters Supplying Microporcessor Loads," Electric Power Applications, IEE Proceedings, 152(5):1171-1178, Sep. 2005.
Xu, X. et al., "A Quasi Fixed Frequency Constant On Time Controlled Boost Converter," IEEE, pp. 2206-2209, 2008.

(Continued)

*Primary Examiner*—Shawn Riley
(74) *Attorney, Agent, or Firm*—Darby & Darby P.C.; Matthew M. Gaffney

(57) ABSTRACT

A projected on-time (POT) switching regulator is provided. The regulator includes a switching regulator controller and a main switch. The controller includes a feedback comparator and an on-timer. The feedback comparator compares the output voltage to a reference voltage. Whenever the feedback comparator trips, the main switch is turned on, and the on-timer controls the turn-on duration (on-time) of the main switch, where the duration is adjusted by the input and output voltages according to a preset transfer function. The transfer function is applicable to both CCM and DCM operation. However, during CCM mode operation, at least above a minimum on-time, the on-time is adjusted so that the switching frequency of the regulator is approximately constant. The on-timer includes a comparator that compares an adjustable voltage VFQ to a ramp voltage VIFQ generated by providing an adjustable current IFQ to a capacitor CREF. VFQ and IFQ are adjusted so that, during CCM mode operation, at least above the minimum on-time, the switching frequency of the regulator is approximately constant.

20 Claims, 5 Drawing Sheets

OTHER PUBLICATIONS

Middlebrook, R. D., et al., "A General Unified Approach to Modelling Switching-Converter Power Stages," IEEE Power Electronics Specialist Conference 1976, International Journal of Electronics, 42(6):521-550, Jun. 1977.

Sable, D. M., et al., "Elimination of the Positive Zero in Fixed Frequency Boost and Flyback Converters," IEEE Applied Power of Electronics Conference and Exposition 1990. APEC '90, Conference Proceedings 1990, Fifth Annual, pp. 205-211, Mar. 1990.

Keskar et al. "Self-Stabilizing, Integrated, Hysteretic boost DC-DC Converter," IEEE 30th Annual Conference on Industrial Electronics Society, 2004, 6 pages.

Nabeshima et al. "A Novel Control Method of Boost and Buck-Buck Boost Converters with a Hysteretic PWM Controller," European Conference on Power Electronics and Applications, 2005, 6 pages.

* cited by examiner

APPARATUS AND METHOD FOR PROJECTED ON-TIME REGULATOR

FIELD OF THE INVENTION

The invention is related to switching regulators, and in particular but not exclusively, to an apparatus and method for a projected on-time (POT) regulator.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor stores charge to provide Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology.

BRIEF DESCRIPTION OF THE DRAWINGS

Non-limiting and non-exhaustive embodiments of the present invention are described with reference to the following drawings, in which.

DETAILED DESCRIPTION

Figure 1:
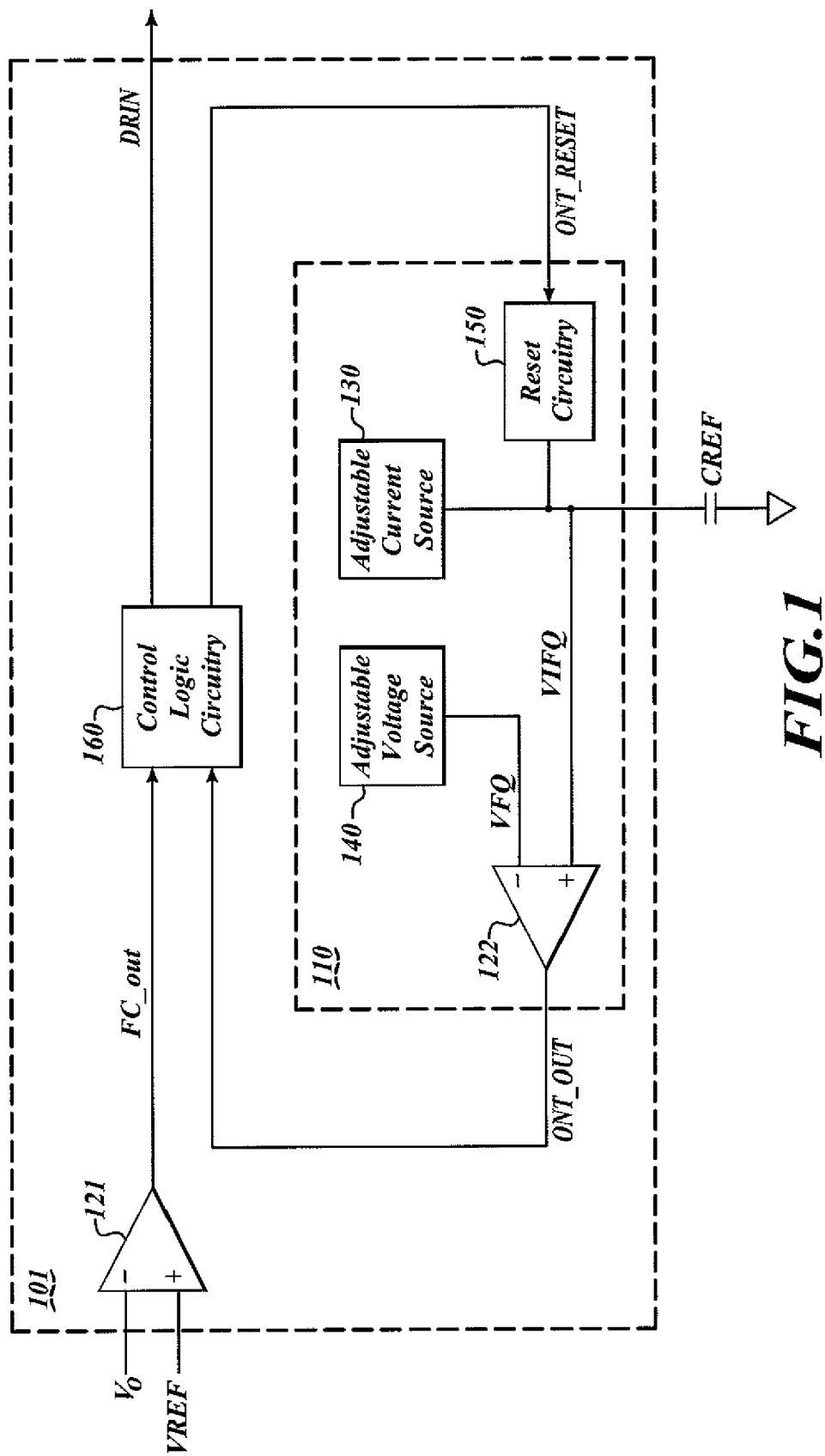
FIG. 1 shows a block diagram of an embodiment of a regulator controller.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a projected on-time (POT) switching regulator. The regulator includes a switching regulator controller and a main switch. The controller includes a feedback comparator and an on-timer. The feedback comparator compares the output voltage to a reference voltage. Whenever the feedback comparator trips, the main switch is turned on, and the on-timer controls the turn-on duration (on-time) of the main switch, where the duration is adjusted by the input and output voltages according to a preset transfer function. The transfer function is applicable to both CCM and DCM operation. However, during CCM mode operation, at least above a minimum on-time, the on-time is adjusted so that the switching frequency of the regulator is approximately constant. The on-timer includes a comparator that compares an adjustable voltage VFQ to a ramp voltage VIFQ generated by providing an adjustable current IFQ to a capacitor CREF. VFQ and IFQ are adjusted so that, during CCM mode operation, at least above the minimum on-time, the switching frequency of the regulator is approximately constant.

Figure 2:
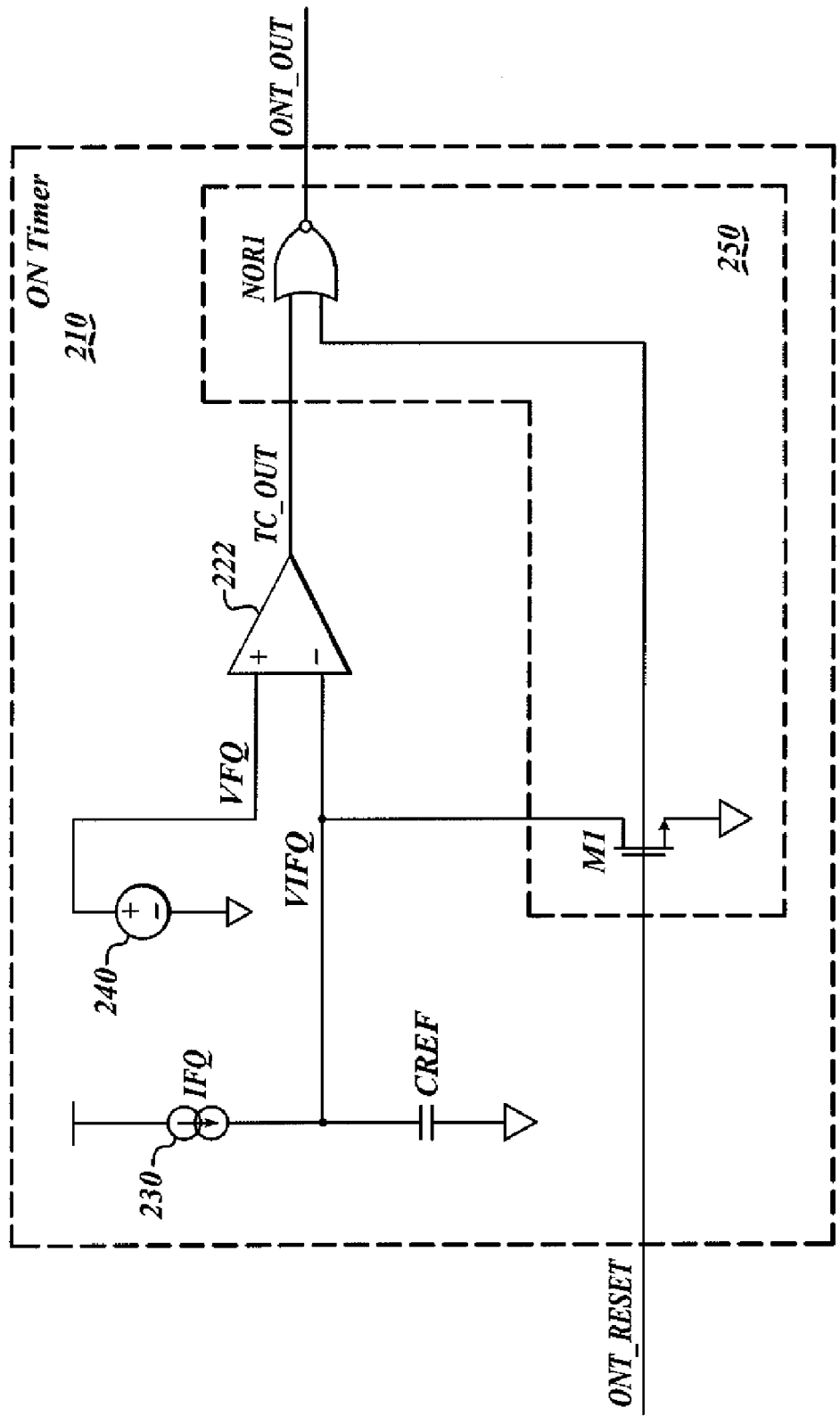
FIG. 2 illustrates a block diagram of an embodiment of the on-timer of FIG. 1.

FIG. 1 shows a block diagram of an embodiment of regulator controller 101. Regulator controller 101 includes feedback comparator 121, control logic circuitry 160, capacitor Cref, and on-timer 110. On-timer 110 includes on-timer comparator 122, adjustable current source 130, adjustable voltage source 140, and reset circuitry 150. In various embodiments, capacitor Cref may be either external to on-timer 110 (for example, as illustrated in FIG. 1) or internal to the on-timer (for example, as illustrated in FIG. 2)

Feedback comparator 121 is arranged to compare output voltage Vo with reference voltage Vref, and to provide feedback comparator output signal FC_out based on the comparison (in some embodiments, feedback comparator 121 compares Vref with feedback voltage Vfb, where Vfb is based on Vo, rather than comparing Vref with Vo directly). Control Logic circuitry 160 is arranged to provide on-timer reset signal ONT_RESET based, at least in part, on feedback comparator output signal FC_out and on-timer output signal ONT_OUT. Control logic circuitry 160 may be further arranged to provide driver input signal DRIN based, in part, on on-timer output signal ONT_OUT. On-timer 110 is arranged to provide on-timer output signal ONT_OUT so that, whenever signal FC_out is asserted, signal ONT_OUT is asserted at a specific duration of time after the time that signal FC_out was asserted. Further, on-timer 110 is arranged such that the specific duration is based, at least in part, on adjustable current IFQ, adjustable voltage VFQ, and the capacitance of reference capacitor Cref.

In one embodiment, Control Logic circuitry 160 is arranged to de-assert on-timer reset signal ONT_RESET when signal FC_out is asserted, and to keep signal ONT_RESET de-asserted until signal ONT_OUT becomes asserted. In one embodiment, Control Logic circuitry 160 is an RS latch, with signal FC_out going to the S input of the RS latch, signal ONT_OUT going to the R input of the RS latch, and with the Qbar output of the RS latch providing signal ONT_RESET. In other embodiments, Control Logic circuitry 160 may further include circuitry for ensuring a minimum off-time.

In one embodiment, reset circuitry 150 is arranged to operate as follows. Reset circuitry 150 is arranged to keep capacitor Cref discharged as long as signal ONT_RESET is asserted. Further, reset circuitry 150 may be also arranged to ensure that signal ONT_OUT is not asserted while signal ONT_RESET is asserted. When signal ONT_RESET is de-asserted, reset circuitry 150 allows capacitor Cref to charge, and makes it possible for signal ONT_OUT to be asserted, so that signal ONT_OUT is asserted when ramp voltage VIFQ reaches voltage VFQ.

In this embodiment, when signal FC_out is asserted, Control Logic circuitry 160 de-asserts signal ONT_RESET, and reset circuitry 150 in turns allows capacitor Cref to be charged by current IFQ. At this point, voltage VIFQ begins ramping upward because of the current IFQ applied to capacitor CREF. Voltage VIFQ ramps upward until it reaches voltage VFQ. Once voltage VIFQ reaches voltage VFQ, comparator 122 trips, causing signal ONT_OUT to be asserted. At this point, in this embodiment, reset determination circuitry 160 asserts signal ONT_RESET, causing capacitor CREF to discharge and remain discharged, and for signal ONT_OUT to be de-asserted and remain unasserted. In this embodiment, signal ONT_OUT remains unasserted until signal FC_out is asserted again.

In on-timer 110, the parameters VFQ, IFQ, and Cref determine the on-time of signal driver input signal DRIN when signal feedback comparator output signal FC_OUT is asserted. Specifically, in the embodiment illustrated, $T_{ON} = (VFQ/IFQ) \cdot CREF$, where $T_{ON}$ is the on-time of the pulse of signal DRIN.

In various embodiments, circuitry may also be included to enforce minimum off-times, minimum on-times, and other similar functions that would cause the operation to differ slightly from the exact functionality stated above.

Adjustable voltage source 140 and adjustable current source 130 are arranged to be adjusted based output voltage Vo and the input voltage Vin (not shown in FIG. 1) such that, during continuous conduction mode (CCM) operation, at least while the on-time of signal DRIN is above a pre-determined minimum on-time, a frequency of signal DRIN is maintained at a substantially constant frequency. In some embodiments, there is no minimum on-time, so that, during CCM, the frequency of signal DRIN is maintained constant regardless of on-time. In other embodiments, a minimum on-time is enforced, so that, during CCM, the frequency of signal DRIN is maintained constant as long as the on-time is above the minimum on-time. Otherwise, the on-time as maintained at the minimum on-time.

Input voltage Vin and output voltage Vo affect IFQ and VFQ, but it is not necessarily the case that both the input voltage and output voltage Vo affect both of IFQ and VFQ. For example, in one embodiment, VFQ is based on both Vin and Vo, and IFQ is based on Vo but not Vin. In another embodiment, IFQ is based on Vo but not Vin, and VFQ is based on Vin and not Vo. These embodiments and others are within the scope and spirit of the invention.

FIG. 2 illustrates a block diagram of an embodiment of on-timer 210, which may be employed as an embodiment of on-timer 110 of FIG. 1. Reset circuitry 250 includes transistor M1 and NOR gate NOR1.

In operation, timer comparator 222 provides timer comparator output signal TC_OUT based on the comparison of voltage VFQ with voltage VIFQ. Additionally, transistor M1 is arranged to close when signal ONT_RESET is asserted and to open otherwise. When transistor M1 is closed, capacitor Cref remains discharged, and when transistor M1 is open, capacitor Cref is charged by current IFQ so that ramp voltage VIFQ ramps upward. Also, NOR gate NOR1 is arranged to provide signal ONT_OUT based on signal TC_OUT and signal ONT_RESET.

Figure 3:
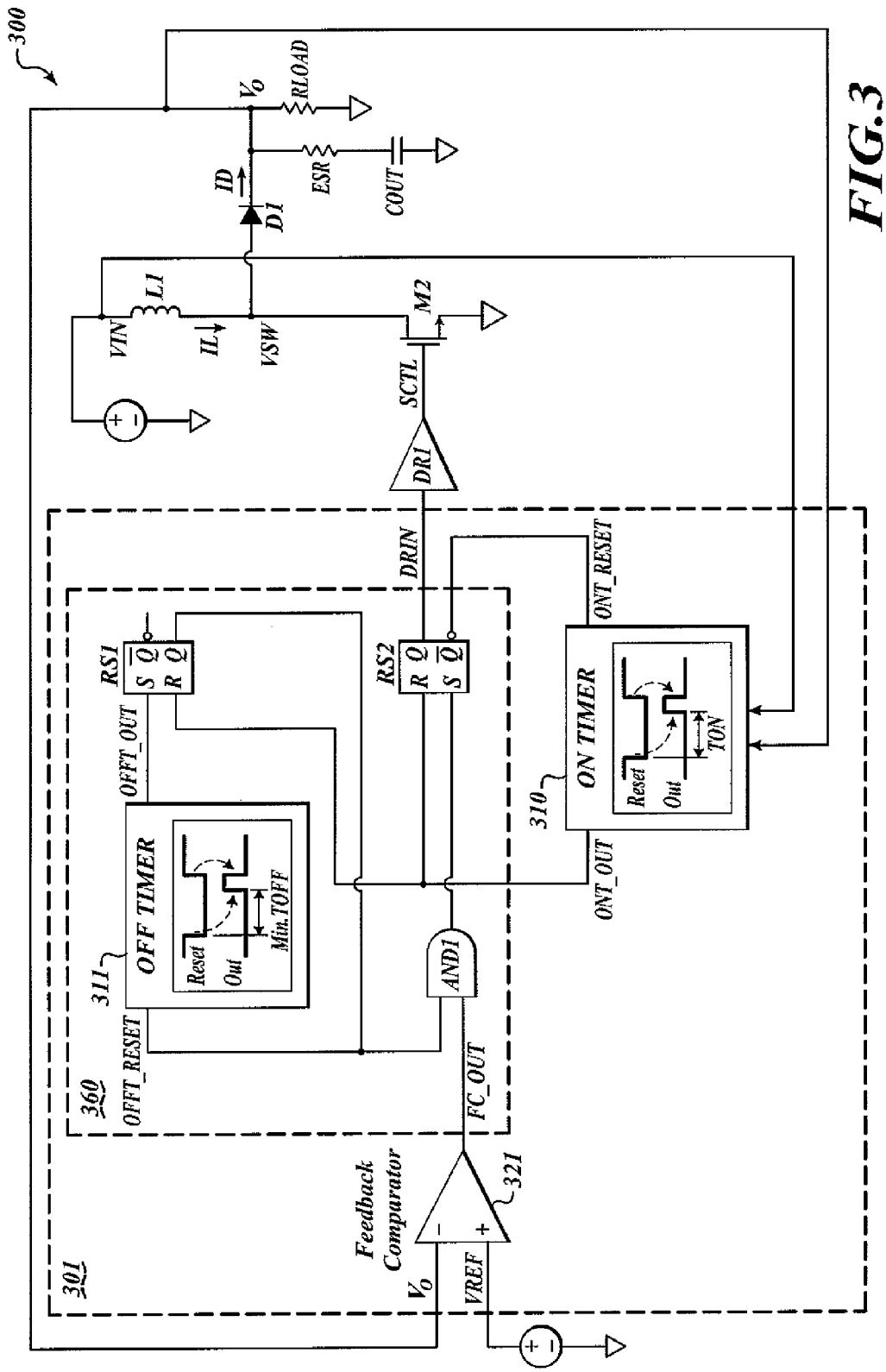
FIG. 3 shows a block diagram of an embodiment of a switching regulator that includes an embodiment of the on-timer of FIG. 2.

On-timer 210 may be used for virtually any switching regulator topology, such as boost, buck, buck-boost, inverting, SEPIC, and/or the like. FIG. 3 below illustrates an example of a boost embodiment.

FIG. 3 shows a block diagram of an embodiment of switching regulator 300. Switching regulator 300 may include inductor L1, diode D1, output capacitor Cout (which has an equivalent series resistance illustrated as ESR), a load that is represented by load resistance RLOAD, transistor M2, driver DR1, and switching regulator controller 301. Switching regulator controlled 301 may be employed as an embodiment of switching regulator controller 101 of FIG. 1. Switching regulator controller 301 includes feedback comparator 321, control logic circuitry 360, and on-timer 310. On-timer 310 is an embodiment of on-timer 210 of FIG. 2. In the embodiment illustrated, control logic circuitry 360 includes off-timer 311, RS latch RS1, RS latch RS2, and AND gate AND1.

In operation, control logic circuitry 360 provides on-timer reset signal ONT_RESET so that signal ONT_RESET is asserted (asserted low in the illustrated embodiment) until signals FC_OUT and OFFT_SET are both asserted. When signal ONT_RESET is de-asserted, it remains de-asserted until signal ONT_OUT is asserted. However, in the embodiment illustrated, control logic circuitry 360 also ensures that, even if signal FC_out is asserted, signal ONT_RESET is not de-asserted until a minimum off-time has occurred since the end of the last pulse in signal DRIN.

The illustrated embodiment of switching regulator 300 is a boost switching regulator. Transistor M2 is a power switch that is arranged to open and close based on switch control signal SCTL. In one embodiment, Driver DR1 is a gate driver that drives the gate of transistor M2 by providing switch control signal SCTL from driver input signal DRIN. Inductor L1 is arranged to provide inductor current $I_L$. In one embodiment, diode D1 is arranged to provide current rectification, and to provide diode current $I_D$. In some embodiments, diode D1 may be replaced with a synchronous switch or the like. Capacitor COUT is arranged to store charge to provide output voltage Vout from diode current $I_D$. Further, load resistance RLOAD is driven by output voltage Vo.

Although FIG. 3 illustrates a boost regulator topology, other topologies may be used such as buck, SEPIC, inverting, and/or the like. Also, although an asynchronously rectified regulator is illustrated in FIG. 3, in other embodiments, a synchronously rectified regulator topology, or the like, may be used instead. These embodiments and others are within the scope and spirit of the invention.

Considering FIG. 3 in conjunction with FIG. 2, with on-timer 210 used as on-timer 310 of FIG. 3, adjustable current source 230 and adjustable voltage source 240 are controlled as follows.

Assuming that $V_O \gg$ diode drop (of D1), for CCM operation, $$\text{DUTY} = \frac{V_O - V_{IN}}{V_O}, \quad (1)$$

where DUTY represents the duty cycle of signal SCTL, and $$FREQ = \frac{\text{DUTY}}{T_{ON}} = \left(\frac{V_O - V_{IN}}{V_O}\right) \cdot \frac{1}{T_{ON}}, \quad (2)$$

where FREQ represents the frequency of signal SCTL, and $T_{ON}$ represents the on-time of main switch M2.

From (2), if $T_{ON}$ is fixed, FREQ varies with Vin.

For on-timer 210 of FIG. 2, $$T_{ON} = \frac{V_{FQ}}{I_{FQ}} \cdot C_{REF} \quad (3)$$

Substituting (3) into (2), $$FREQ = \frac{\text{DUTY}}{T_{ON}} = \left(\frac{V_O - V_{IN}}{V_O}\right) \cdot \frac{I_{FQ}}{V_{FQ} \cdot C_{REF}} \quad (4)$$

For the boost regulator topology shown in FIG. 3, on-timer 310 is arranged to provide $V_{FQ}$ and $I_{FQ}$ as follows, $$V_{FQ} = K_1 \cdot (V_O - V_{IN}) \quad (5)$$

and $$I_{FQ} = \frac{V_O}{R_{REF} \cdot K_2} \quad (6)$$

where $K_1$ and $K_2$ are pre-determined circuit constants, $R_{REF}$ is a reference resistor value. Alternative, conductive/resistance needed to convert the voltage into current IFQ or vice versa may be provided in an alternative manner than via reference resistor $R_{REF}$, so that a more generic equation IFQ=(Vo*G1)/K2, where G1 is a pre-determined conductance, that may be generated by a reference resistor $R_{REF}$ (in this case, G=1/$R_{REF}$), or in some other manner.

Substituting (5) and (6) into (4), $$FREQ = \frac{1}{K_1 \cdot K_2 \cdot R_{REF} \cdot C_{REF}} \quad (7)$$

With this approach, at CCM operation, switching frequency can be adjustable and not varying with $V_{IN}$ for the boost topology illustrated in FIG. 3.

Figure 4:
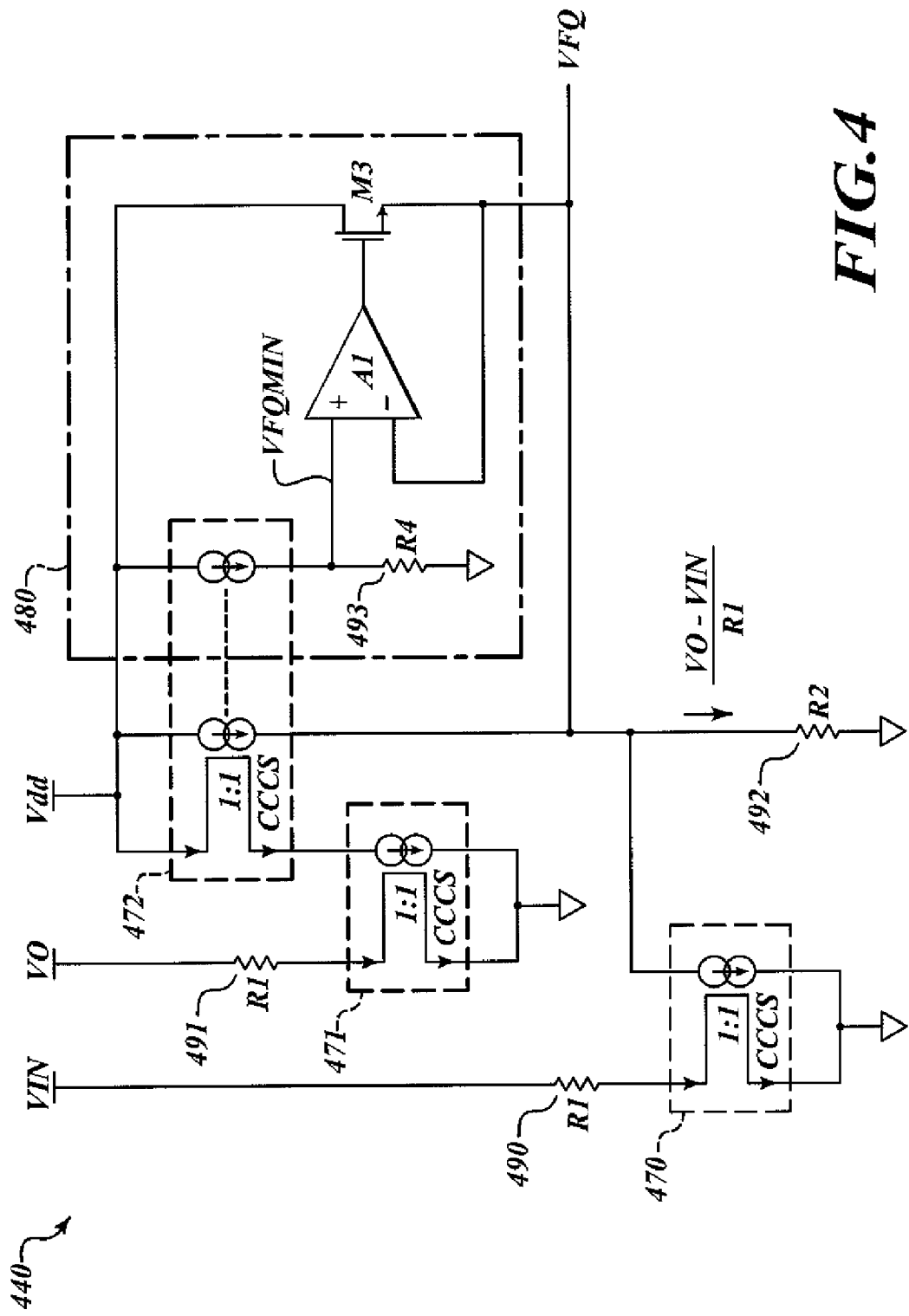
FIG. 4 illustrates a block diagram of an embodiment of the adjustable voltage source of FIG. 2.

FIG. 4 illustrates a block diagram of an embodiment of adjustable voltage source 440, which may be employed as an embodiment of adjustable voltage source 240 of FIG. 2. Adjustable voltage source 440 includes resistors 490-492, and current mirrors 470-472, and voltage clamp 480. Voltage clamp 480 includes resistor 493, op amp A1, transistor M3, and a portion of current mirror 472. Resistors 490 and 491 both have a resistance of R1. Resistor 492 has a resistance of R2. Resistor 493 has a resistance of R4.

Resistor 490 and current mirror 470 operate together to provide and mirror a current of Vin/R1. Resistor 491, current mirror 471, and current mirror 472 operate together to provide and mirror a current of Vo/R1. These currents are both mirrored and provided to resistor 492 so that resistor 492 receives a current of (Vo−Vin)/R1. When not clamped by voltage clamp 480, the voltage across resistor R2 is (R2/R1)*(Vo−Vin), so that VFQ=(R2/R1)*(Vo−Vin) when not clamped. In this example, K1=R2/R1.

Voltage clamp 480 is arranged to clamp the voltage VFQ to being no less than $V_{FQMIN}$, where, in this example:

$$V_{FQMIN} = \frac{R_4}{R_1} \cdot V_O = K_4 \cdot V_O \quad (8)$$

Accordingly, in this boost topology, $$V_{FQ} = \text{MAX}\left(V_{FQMIN}, \frac{R_2}{R_1} \cdot (V_O - V_{IN})\right)$$

Figure 5:
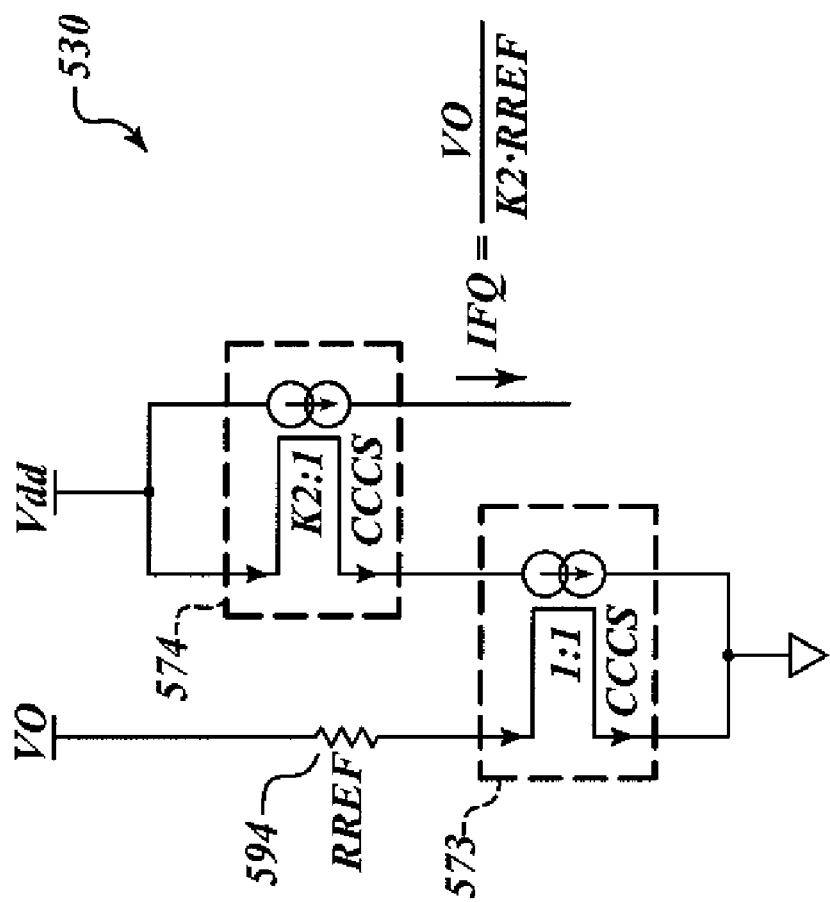
FIG. 5 shows a block diagram of an embodiment of the adjustable current source of FIG. 2, arranged in accordance with aspects of the present invention.

FIG. 5 shows a block diagram of an embodiment of adjustable current source 530, which may be employed as an embodiment of adjustable current source 230 of FIG. 2. Adjustable current source 530 includes reference resistor 594, current mirror 573, and current mirror 574. Resistor 594 is arranged such that is has a voltage of Vo across it, so that the current through resistor 594 is Vo/RREF. Current mirror 573 is arranged to mirror the current across resistor 594 to current mirror 574, where current mirror 574 mirrors the current to provide current IFQ, and where current mirror 574 has a current mirror ratio of $K_2$:1. Accordingly, current IFQ=Vo/($K_2$*RREF).

Accordingly, in the boost topology embodiment described above, $$V_{FQ} = \text{MAX}\left(V_{FQMIN}, \frac{R_2}{R_1} \cdot (V_O - V_{IN})\right) \text{ and } I_{FQ} = \frac{V_O}{R_{REF} \cdot K_2}$$

As stated in equation (4) above, $$FREQ = \frac{\text{DUTY}}{T_{ON}} = \left(\frac{V_O - V_{IN}}{V_O}\right) \cdot \frac{I_{FQ}}{V_{FQ} \cdot C_{REF}}$$

In the case where $V_{FQ}$ is not clamped by the voltage clamp 480, then, $$FREQ = \frac{1}{K_1 \cdot K_2 \cdot R_{REF} \cdot C_{REF}}, \quad \text{where } K_1 = \frac{R_2}{R_1}$$

Accordingly, during CCM, when VFQ is not clamped by voltage clamp 480, the switching frequency depends only on circuit constants rather than $V_{IN}$ or $V_O$.

Accordingly, the on-time is modulated based on $V_{IN}$ and $V_O$ for a constant switching frequency at Continuous Conduction Mode (CCM) when voltage VFQ is not clamped by voltage clamp 480. At DCM, $T_{ON}$ is also adjusted according to equation (3), but the frequency is proportional to the loading current (i.e., the current through resistor RLOAD of FIG. 3).

In some embodiments, in order to prevent Ton from being too low, $V_{FQ}$ is clamped at a minimum, $V_{FQMIN}$, by the voltage clamp 480.

For setting the circuit parameters for, $$V_{FQMIN} = \frac{R_4}{R_1} \cdot V_O = K_4 \cdot V_O \qquad (8)$$

As stated in equation (3), $$T_{ON,MIN} = \frac{V_{FQMIN}}{I_{FQ}} \cdot C_{REF} = K_4 \cdot K_2 \cdot R_{REF} \cdot C_{REF},$$

which is constant with respect to $V_{IN}$ and $V_O$.
For configuration the on-timer with following parameters:

$$V_{FQ} = \text{MAX}(V_{FQMIN}, K_1 * (V_O - V_{IN}))$$

$$I_{FQ} = \frac{V_O}{R_{REF} \cdot K_2}$$

where, $$V_{FQMIN} = K_4 \cdot V_O$$

$$K_1 = \frac{R_2}{R_1}$$

$$K_4 = \frac{R_4}{R_1}$$

The operating equations are:

$$FREQ = \frac{1}{K_1 \cdot K_2 \cdot R_{REF} \cdot C_{REF}}$$

$$T_{ON,MIN} = \frac{V_{FQMIN}}{I_{FQ}} \cdot C_{REF} = K_4 \cdot K_2 \cdot R_{REF} \cdot C_{REF}$$

The adjustments used for adjustable current source 130 and adjustable voltage source 140 of FIG. 1 vary depending on the type of switching regulator topology. For example, for a boost regulator topology, a buck regulator topology, and a SEPIC regulator topology, each will be different.

For each of the three, the common equations are commonly used:

$$FREQ_{CCM} = \frac{1}{K_1 \cdot K_2 \cdot R_{REF} \cdot C_{REF}}$$

$$T_{ON,MIN} = K_2 \cdot K_4 \cdot R_{REF} \cdot C_{REF},$$

where $K_1$, $K_2$ and $K_4$ are ratiometric circuit parameters.
For BOOST, $$DUTY_{CCM} = \frac{V_O - V_{IN}}{V_O}$$

$$FREQ_{CCM} = \left(\frac{V_O - V_{IN}}{V_O}\right) \cdot \frac{1}{T_{ON}}$$

-continued $$T_{ON} = \frac{V_{FQ}}{I_{FQ}} \cdot C_{REF}$$

$$V_{FQ} = \text{MAX}(K_1 \cdot (V_O - V_{IN}), K_4 \cdot V_O)$$

$$I_{FQ} = \frac{V_O}{R_{REF} \cdot K_2}$$

For SEPIC, $$DUTY_{CCM} = \frac{V_O}{V_{IN} + V_O}$$

$$FREQ_{CCM} = \left(\frac{V_O}{V_{IN} + V_O}\right) \cdot \frac{1}{T_{ON}}$$

$$T_{ON} = \frac{V_{FQ}}{I_{FQ}} \cdot C_{REF}$$

$$V_{FQ} = \text{MAX}(K_1 \cdot V_O, K_4 \cdot (V_{IN} + V_O))$$

$$I_{FQ} = \frac{V_{IN} + V_O}{R_{REF} \cdot K_2}$$

For BUCK, $$DUTY_{CCM} = \frac{V_O}{V_{IN}}$$

$$FREQ_{CCM} = \left(\frac{V_O}{V_{IN}}\right) \cdot \frac{1}{T_{ON}}$$

$$T_{ON} = \frac{V_{FQ}}{I_{FQ}} \cdot C_{REF}$$

$$V_{FQ} = \text{MAX}(K_1 \cdot V_O, K_4 \cdot V_{IN})$$

$$I_{FQ} = \frac{V_{IN}}{R_{REF} \cdot K_2}$$

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulation, comprising:
a regulator controller that is arranged control conversion an input voltage into an output voltage such that the output voltage is regulated, wherein the regulator controller includes:
  a first comparator that is arranged to compare a reference signal with a feedback signal, wherein the feedback signal is based, at least in part, on the output voltage; and
  an on-timer that is arranged to provide an on-timer output signal such that the on-timer reset signal is based, at least in part, on the first comparator output signal, wherein the on-timer includes:
    an adjustable voltage source that is arranged to provide a first comparison voltage at a first comparison voltage node such that the first comparison voltage is based, in part, on at least one of the output voltage or the input voltage;
    an adjustable current source that is coupled to a capacitor node, wherein the adjustable current source is arranged to provide a first current to the capacitor node such that the first current is based, in part, on at least one of the output voltage or the input voltage such that a second comparison voltage is provided at the capacitor node; and a second comparator that is arranged to compare the first comparison voltage with the second comparison voltage to provide a second comparator output signal, wherein the on-timer output signal is based, at least in part, on the second comparator output signal; and wherein the adjustable voltage source and adjustable current source are arranged to be adjusted based on the output voltage and the input voltage such that, during continuous conduction mode operation, at least while an on time of the regulator controller output signal is above a pre-determined minimum on time, a frequency of the regulator controller output signal is maintained at a substantially constant frequency.

2. The circuit of claim 1, further comprising:
a capacitor that is coupled to the capacitor node.

3. The circuit of claim 1, wherein
the regulator controller further includes control logic circuitry, wherein the control logic circuitry is arranged to provide a regulator controller output signal from the on-timer output signal, and further arranged to provide the on-timer reset signal based, in part, on the feedback comparator output signal, such that whenever the feedback comparator output signal is asserted, the on-timer reset signal is de-asserted if a pre-determined minimum off-time has occurred since that last time the feedback comparator output signal was asserted.

4. The circuit of claim 1, wherein
the on-timer further includes:
a switch that is arranged to discharge a capacitor at the capacitor node while the regulator controller output signal is unasserted, and to allow the capacitor to charge while the regulator controller output signal is asserted.

5. The circuit of claim 1, further comprising:
a power switch that is arranged to open and close to regulate the output voltage responsive to a regulator controller output signal, wherein the regulator controller output signal is based, in part, on the on-timer output signal, and wherein the power switch arranged to close when the regulator controller output signal corresponds to a first logic level, and to open when regulator controller output signal corresponds to a second logic level.

6. The circuit of claim 1, wherein
the feedback signal is the output voltage.

7. The circuit of claim 1, wherein
the regulator controller is a boost regulator controller;
the adjustable voltage source is arranged to provide the first comparison voltage such that that first comparison voltage is substantially given by VFQ=K1*(Vout−Vin), where VFQ represents the first comparison voltage, Vout represents the output voltage, Vin represents the input voltage, and where K1 represents a first pre-determined constant; and
wherein the adjustable current source is arranged to provide the first current such that the first current is substantially given by IFQ=Vout*G1, where IFQ represents the first current, and where G1 represents a pre-determined conductance.

8. The circuit of claim 1, wherein
the regulator controller is a boost regulator controller;
the adjustable voltage source is arranged to provide the first comparison voltage such that that first comparison voltage is substantially given by VFQ=MAX(K1*(Vout−Vin), K4*Vout), where VFQ represents the first comparison voltage, Vout represents the output voltage, Vin represents the input voltage, and where K1 represents a first pre-determined constant, and K4 represents a second pre-determined constant; and
wherein the adjustable current source is arranged to provide the first current such that the first current is substantially given by IFQ=Vout*G1, where IFQ represents the first current, and where G1 represents a pre-determined conductance.

9. The circuit of claim 1, wherein
the regulator controller is a buck regulator controller;
the adjustable voltage source is arranged to provide the first comparison voltage such that that first comparison voltage is substantially given by VFQ=K1*Vout, where VFQ represents the first comparison voltage, and where K1 represents a first pre-determined constant; and
wherein the adjustable current source is arranged to provide the first current such that the first current is substantially given by IFQ=Vin*G1, where IFQ represents the first current, Vin represents the input voltage, and where G1 represents a pre-determined conductance.

10. The circuit of claim 1, wherein
the regulator controller is a buck regulator controller;
the adjustable voltage source is arranged to provide the first comparison voltage such that that first comparison voltage is substantially given by VFQ=MAX(K1*Vout, K4*Vin), where VFQ represents the first comparison voltage, Vout represents the output voltage, Vin represents the input voltage, K1 represents a first pre-determined constant, and where K4 represents a second pre-determined constant; and
wherein the adjustable current source is arranged to provide the first current such that the first current is substantially given by IFQ=Vin*G1, where IFQ represents the first current, and where G1 represents a pre-determined conductance.

11. The circuit of claim 1, wherein
the regulator controller is a SEPIC regulator controller;
the adjustable voltage source is arranged to provide the first comparison voltage such that that first comparison voltage is substantially given by VFQ=K1*Vout, where VFQ represents the first comparison voltage, Vout represents the output voltage, and where K1 represents a first pre-determined constant; and
wherein the adjustable current source is arranged to provide the first current such that the first current is substantially given by IFQ=(Vin+Vout)*G1, where IFQ represents the first current, Vin represents the input voltage, and where G1 represents a pre-determined conductance.

12. The circuit of claim 1, wherein
the regulator controller is a SEPIC regulator controller;
the adjustable voltage source is arranged to provide the first comparison voltage such that that first comparison voltage is substantially given by VFQ=MAX(K1*Vout,K4*(Vin+Vout)), where VFQ represents the first comparison voltage, Vout represents the output voltage, Vin represents the input voltage, and where K1 represents a first pre-determined constant; and
wherein the adjustable current source is arranged to provide the first current such that the first current is substantially given by IFQ=(Vin+Vout)*G1, where IFQ represents the first current, and where G1 represents a pre-determined conductance.

13. The circuit of claim 1, wherein
the on-timer further includes:
  logic circuitry that is arranged to provide the on-timer output signal from the second comparator output signal, wherein the logic circuitry is arranged such that on-timer output signal is arranged to be asserted if the second comparator output signal is asserted and the on-timer reset signal is not asserted, and de-asserted otherwise.

14. The circuit of claim 13, wherein
the logic circuitry is a NOR gate.

15. A circuit for regulation, comprising:
a boost regulator controller that is arranged control conversion an input voltage into an output voltage such that the output voltage is regulated, wherein the boost regulator controller includes:
  a first comparator that is arranged to compare a reference signal with a feedback signal, wherein the feedback signal is based, at least in part, on the output voltage; and
  an on-timer that is arranged to provide an on-timer output signal such that the on-timer reset signal is based, at least in part, on the first comparator output signal, wherein the on-timer includes:
    an adjustable voltage source that is arranged to provide a first comparison voltage at a first comparison voltage node such that that first comparison voltage is substantially given by $VFQ=K1*(Vout-Vin)$ at least above a minimum value for VFQ, where VFQ represents the first comparison voltage, Vout represents the output voltage, Vin represents the input voltage, and where K1 represents a first pre-determined constant;
    an adjustable current source that is coupled to a capacitor node, wherein the adjustable current source is arranged to provide a first current to the capacitor node such that the first current is substantially given by $IFQ=Vout*G1$, where IFQ represents the first current, and where G1 represents a pre-determined conductance; and
    such that a second comparison voltage is provided at the capacitor node; and
    a second comparator that is arranged to compare the first comparison voltage with the second comparison voltage to provide a second comparator output signal, wherein the on-timer output signal is based, at least in part, on the second comparator output signal.

16. The circuit of claim 15, wherein
the minimum value of VFQ is $K4*Vout$, where K4 is a pre-determined constant, such that $VFQ=MAX(K1*(Vout-Vin), K4*Vout)$.

17. The circuit of claim 15, wherein
the regulator controller further includes control logic circuitry, wherein the control logic circuitry is arranged to provide a regulator controller output signal from the on-timer output signal, and further arranged to provide an on-timer reset signal based, in part, on the feedback comparator output signal, such that whenever the feedback comparator output signal is asserted, the on-timer reset signal is de-asserted if a pre-determined minimum off-time has occurred since that last time the feedback comparator output signal was asserted, and
wherein the on-timer further includes:
  a switch that is arranged to discharge a capacitor at the capacitor node while the regulator controller output signal is unasserted, and to allow the capacitor to charge while the regulator controller output signal is asserted; and
  logic circuitry that is arranged to provide the on-timer output signal from the second comparator output signal, wherein the logic circuitry is arranged such that on-timer output signal is arranged to be asserted if the second comparator output signal is asserted and the on-timer reset signal is not asserted, and de-asserted otherwise.

18. A circuit for regulation, comprising:
a buck regulator controller that is arranged control conversion an input voltage into an output voltage such that the output voltage is regulated, wherein the buck regulator controller includes:
  a first comparator that is arranged to compare a reference signal with a feedback signal, wherein the feedback signal is based, at least in part, on the output voltage; and
  an on-timer that is arranged to provide an on-timer output signal such that the on-timer reset signal is based, at least in part, on the first comparator output signal, wherein the on-timer includes:
    an adjustable voltage source that is arranged to provide a first comparison voltage at a first comparison voltage node such that that first comparison voltage is substantially given by $VFQ=K1*Vout$ at least above a minimum value for VFQ, where VFQ represents the first comparison voltage, Vout represents the output voltage, and where K1 represents a first pre-determined constant;
    an adjustable current source that is coupled to a capacitor node, wherein the adjustable current source is arranged to provide a first current to the capacitor node such that the first current is substantially given by $IFQ=Vin*G1$, where IFQ represents the first current, and where G1 represents a pre-determined conductance; and such that a second comparison voltage is provided at the capacitor node; and
    a second comparator that is arranged to compare the first comparison voltage with the second comparison voltage to provide the on-timer output signal
    a second comparator that is arranged to compare the first comparison voltage with the second comparison voltage to provide a second comparator output signal, wherein the on-timer output signal is based, at least in part, on the second comparator output signal.

19. The circuit of claim 18, wherein
the minimum value of VFQ is $K4*Vin$, where K4 is a pre-determined constant, such that $VFQ=MAX(K1*Vout, K4*Vin)$.

20. The circuit of claim 18, wherein
the regulator controller further includes control logic circuitry, wherein the control logic circuitry is arranged to provide a regulator controller output signal from the on-timer output signal, and further arranged to provide an on-timer reset signal based, in part, on the feedback comparator output signal, such that whenever the feedback comparator output signal is asserted, the on-timer reset signal is de-asserted if a pre-determined minimum off-time has occurred since that last time the feedback comparator output signal was asserted, and
wherein the on-timer further includes:
  a switch that is arranged to discharge a capacitor at the capacitor node while the regulator controller output signal is unasserted, and to allow the capacitor to charge while the regulator controller output signal is asserted; and logic circuitry that is arranged to provide the on-timer output signal from the second comparator output signal, wherein the logic circuitry is arranged such that on-timer output signal is arranged to be asserted if the second comparator output signal is asserted and the on-timer reset signal is not asserted, and de-asserted otherwise.

\* \* \* \* \*

UNITED STATES PATENT AND TRADEMARK OFFICE
CERTIFICATE OF CORRECTION

| | | |
|---|---|---|
| PATENT NO. | : 7,671,573 B1 | Page 1 of 1 |
| APPLICATION NO. | : 12/129623 | |
| DATED | : March 2, 2010 | |
| INVENTOR(S) | : Lawrence Hok Sun Ling et al. | |

It is certified that error appears in the above-identified patent and that said Letters Patent is hereby corrected as shown below:

On Title page, in Item 56, in column 2, under "OTHER PUBLICATION", line 5, delete "Microporcessor" and insert -- Microprocessor --, therefor.

In column 12, line 26, in claim 18, delete "signal" and insert -- signal; --, therefor.

Signed and Sealed this

Nineteenth Day of October, 2010

David J. Kappos
*Director of the United States Patent and Trademark Office*